United States Patent [19]
Bojarczuk, Jr. et al.

[11] Patent Number: 5,612,131
[45] Date of Patent: Mar. 18, 1997

[54] COMPOSITE MAGNETO-OPTIC MEMORY AND MEDIA

[75] Inventors: Nestor A. Bojarczuk, Jr., Poughkeepsie; Richard J. Gambino, Yorktown Heights; Ralph Ruf, New City, all of N.Y.

[73] Assignee: International Business Machines Corporation, Armonk, N.Y.

[21] Appl. No.: 54,646

[22] Filed: Apr. 26, 1993

[51] Int. Cl.$^6$ ........................................... G11B 5/66
[52] U.S. Cl. .................. 428/332; 428/336; 428/692; 428/694 ML; 428/694 SC; 428/694 MT; 428/694 RE; 428/694 EC; 428/694 T; 428/900
[58] Field of Search .................. 428/694 ML, 694 SC, 428/694 MT, 694 RE, 694 EC, 692, 900, 332, 336, 694 T

[56] References Cited

U.S. PATENT DOCUMENTS

| | | | |
|---|---|---|---|
| 3,475,738 | 10/1969 | Louis et al. | 365/122 |
| 3,818,328 | 6/1974 | Zinn | 324/252 |
| 3,946,124 | 3/1976 | Mee et al. | 427/8 |
| 4,620,872 | 11/1986 | Hijikata et al. | 75/246 |
| 4,683,176 | 7/1987 | Nakamura | 428/692 |
| 4,814,238 | 3/1989 | Tanaka | 428/692 |
| 4,839,226 | 6/1989 | Sawada | 428/336 |
| 4,855,206 | 8/1989 | Saha | 430/106.6 |
| 4,897,320 | 1/1990 | Nomura | 428/694 RE |
| 4,902,584 | 2/1990 | Uchiyama | 428/694 XS |
| 4,929,275 | 5/1990 | Bogatin | 75/246 |
| 4,999,260 | 3/1991 | Saito | 428/694 ML |
| 5,034,146 | 7/1991 | Ohashi et al. | 252/62.57 |
| 5,064,465 | 11/1991 | Chen et al. | 75/349 |
| 5,114,502 | 5/1992 | Bogatin | 148/302 |
| 5,122,203 | 6/1992 | Bogatin | 148/301 |

FOREIGN PATENT DOCUMENTS

| | | | |
|---|---|---|---|
| 0305666 | 3/1989 | European Pat. Off. | G11B 5/64 |
| 0289316 | 11/1989 | European Pat. Off. | C23C 14/06 |
| 0446784 | 9/1991 | European Pat. Off. | G11B 11/10 |
| 62-244105 | 10/1987 | Japan | H01F 1/08 |
| 1160057 | 7/1969 | United Kingdom . | |

OTHER PUBLICATIONS

Gambino et al., "Magnetic,magneto-optic, and transport properties of Tb-doped EuS films", J. Appl. Phys. vol. 70, No. 10, (1991) pp. 6386–6388.

R.J. Gambino, "Magneto-optical recording materials-past, present and future", Magneto-Optical Recording Int'l Sym. '91, Tokyo, Japan Apr. 16–18, 1991.

Matthias et al., "Ferromagnetic interaction in EuO", Phys. Rev. Lett. 7, 161 (1961) pp. 160–161.

K.Y. Ahn, "Increase of Curie Temperature in EuO Films by Fe Doping", Appl. Phys. Lett. 17, 347 (1970).

K.Y. Ahn et al., "Preparation and Structure of Fe-Doped EuO Films", J. Appl. Phus. 42, 1769 (1971).

McGuire et al., "Magnetic and Magneto-Optical Properties of Fe-Doped EuO Films", J. Appl. Phys. 42, 1775 (1971).

J.C. Suits et al., "Annealing Study of EuO Films Doped with Iron and Europium", Journal of Applied Physics, vol. 42, No. 4, (1971) pp. 1777–1778.

Primary Examiner—Leszek Kiliman
Attorney, Agent, or Firm—Robert M. Trepp

[57] ABSTRACT

A magneto-optic memory and a magnetic material is described incorporating a polarized light beam directed towards a magnetic material and an analyzer for intercepting the polarized light beam after passing through the magnetic material or after being reflected by the magnetic material. The magnetic material includes a matrix of metal such as iron, cobalt, nickel, and alloys thereof and a plurality of separated phases distributed in the matrix such as EuS, EuO, EuOTb, PtMnSb, MnAs, MnBi, MnSb, $CrO_2$, CrTe, GdN, $Gd_4C$, other compounds of a rare earth element and manganese compounds. Terbium or neodymium may be dissolved in the matrix of metal and in the plurality of separated phases. The invention overcomes the problem of providing a magnetic material having a Curie point above room temperature, a square perpendicular hysteresis loop at room temperature, a large magneto-optic rotation at the wavelength of interest and a deposition temperature suitable depositing on polymer substrates.

15 Claims, 9 Drawing Sheets

COMPOSITE MAGNETO-OPTIC MEMORY AND MEDIA

BACKGROUND OF THE INVENTION

1. Field of the Invention

This invention relates to a magneto-optic memory utilizing composite magnetic materials exhibiting magneto-optic rotation and, more particularly, to particles such as europium sulfide dispersed throughout a ferromagnetic matrix which are coupled anti-ferromagnetically at their interface.

2. Background of the Prior Art

Magnetic materials for magneto-optic media must have a number of key properties. Magnetic materials must have a Curie point above room temperature, a square perpendicular hysteresis loop at room temperature, a large magneto-optic rotation at the wavelength of interest such as 800 nm for current products and 400 nm for future products and their deposition should be at a low enough temperature to be compatible with both glass and polymer substrates. Magnetic materials must not exhibit grain noise which means they must be either amorphous, microcrystalline or highly oriented crystallographically. A random polycrystalline film will give an unacceptably high grain noise.

One example of a prior art magneto-optical data storage system is described in U.S. Pat. No. 3,475,738 which issued on Oct. 28, 1969 to H. P. Louis et al. wherein a high permanent ferromagnetic metal is covered with a layer of transparent, ferromagnetic, semiconducting material such as a rare-earth chalcogenide under conditions such that these two layers are in a magnetically exchange-coupled relationship. A beam of light is directed through the transparent semiconducting layer wherein it is reflected back through the layer by the ferromagnetic metal and exhibits rotation of the polarized light beam. While ferromagnetic semiconductors such as EuO, EuS or EuSe provide on the order of 800° rotation per decibel of optical energy loss, the Curie points for these materials are below room temperature. For example, the Curie point for EuO is 72° K., the Curie point for EuS is 19° K. and the Curie point for EuSe is 7° K. Thus, if one of these materials was used for the magneto-optic media, the material must be maintained at temperatures which are in the cryogenic temperature range to keep them below their respective Curie temperature.

SUMMARY OF THE INVENTION

An apparatus and method is described for utilizing a magnetic material in a magneto-optic memory comprising a laser, lens, and field magnet for writing data into a magnetic material and a laser, polarizer lens for directing an interrogation beam to a position on the magnetic media, and an analyzer and detector for sensing the rotation of the light beam reflected from or passing through the magnetic media, wherein the magnetic media comprises a matrix of metal selected from the group consisting of iron, cobalt, nickel and alloys thereof, and a plurality of separated phases distributed in the matrix, the separated phases selected from the group consisting of EuS, EuO, EuOTb, PtMnSb, MnBi, MnSb, MnAs, $CrO_2$, CrTe, GdN, $Gd_4C$, other compounds of a rare earth element and manganese compounds.

The invention further provides a composite magnetic material and a method for forming a magnetic material comprising a matrix of metal selected from the group consisting of iron, cobalt, nickel and alloys thereof, and a plurality of separated phases distributed in the matrix, the separated phases selected from the group consisting of EuS, EuO, EuOTb, PtMnSb, MnAs, MnBi, MnSb, $CrO_2$, CrTe, GdN, $Gd_4C$, other compounds of a rare earth element and manganese compounds.

The invention further provides a composite magnetic material and a method for forming the magnetic material comprising a matrix of metal selected from the group consisting of iron, cobalt, nickel and alloys thereof, a plurality of separated phases distributed in the matrix, the separated phases selected from the group consisting of EuS, EuO, EuOTb, PtMnSb, MnAs, MnBi, MnSb, $CrO_2$, CrTe, GdN, $Gd_4C$, other compounds of a rare earth element and manganese compounds, and terbium or neodymium alloyed in said matrix of metal and dissolved in said plurality of separated phases.

The invention provides a magnetic material having a Curie temperature higher than the respective bulk Curie temperature of the separated phases alone when occurring in a layer of material.

The invention provides a magnetic material exhibiting either Kerr or Faraday rotation at room temperature.

The invention further provides a magnetic material including terbium dissolved in a matrix of metal and in a plurality of separated phases distributed in the matrix.

The invention further provides a magnetic material operable at 800 nanometer (nm) wavelength and at 400 nm wavelength.

The invention further provides a magneto-optic storage media operable at room temperature which may be formed on and supported by a glass, or polymer substrate such as a polycarbonate substrate.

BRIEF DESCRIPTION OF THE DRAWINGS

These and other features, objects, and advantages of the present invention will become apparent upon a consideration of the following detailed description of the invention when read in conjunction with the drawings, in which.

DESCRIPTION OF THE PREFERRED EMBODIMENT

Figure 1:
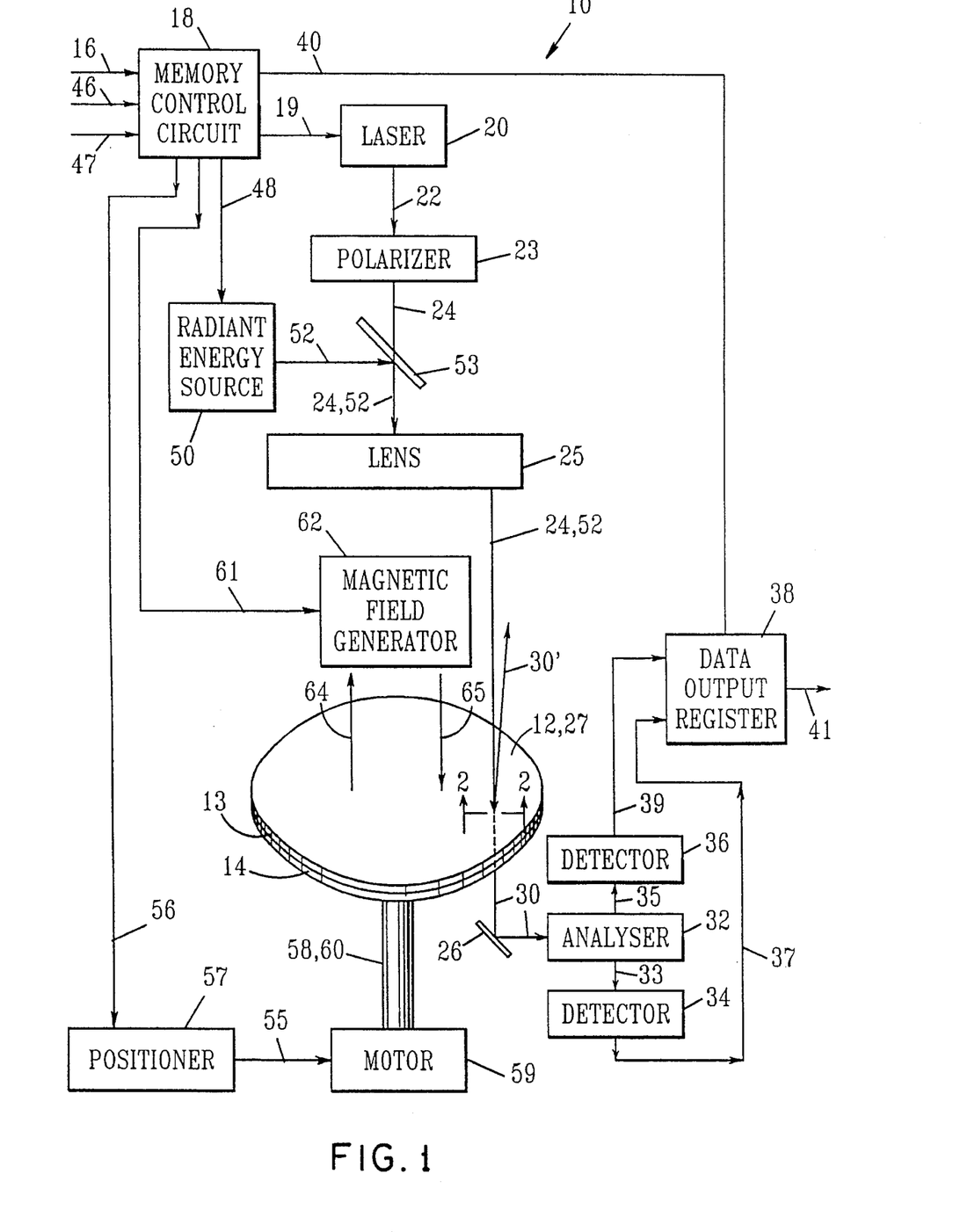
FIG. 1 is one embodiment of the invention.

Referring to FIG. 1, a memory 10 is shown for storing and retrieving data from magnetic material 12. Magnetic material 12 may be in the form of a layer 13 on substrate 14. Substrate 14 may be, for example, glass, or polymer such as polycarbonate. In order to retrieve data from memory 10, a read signal, for example, a logic 1 is present on lead 16 of memory control circuit 18. Memory control circuit 18 provides a control signal over lead 19 to a control input of laser 20. Laser 20 functions to provide a radiant energy source, for example, a monochromatic light beam 22 at a wavelength of 800 nm or at 400 nm having a power in the range from 1 to 10 milliwatts and typically 5 milliwatts. The upper limit of power needs to be such that the temperature of magnetic material 12 is not raised above the Curie temperature during read operation. A non-coherent monochromatic radiant energy source may be substituted for laser 20.

Laser 20 may be, for example, an infrared laser having radiant energy in the energy range from 1.5 to 1.25 eV. Alternately, laser 20 may be a red laser having radiant energy at 1.85 eV corresponding to a wavelength of 670 nm. Or laser 20 may be a blue laser having radiant energy at 3 eV which corresponds to a wavelength of 490 nm. Laser 20 provides a light beam 22 of radiant energy to an input of polarizer 23. Polarizer 23 functions to provide a predetermined polarization to light beam 22 of radiant energy to provide an output light beam 24 of radiant energy. Light beam 24 passes through mirror 53 and lens 25 to be focussed to impinge on or through upper surface 27 of layer 13 of magnetic material 12. Light beam 24 may pass through magnetic material 12 and substrate 14 as light beam 30 or light beam 24 may be reflected by the upper surface of substrate 14 back through magnetic material 12 as light beam 30'. Light beam 30 may be reflected by mirror 26 and directed to analyzer 32. Analyzer 32 functions to detect the polarization of light beam 30 to provide a first output beam 33 to optical detector 34. Analyzer 32 may provide a second output light beam 35 to optical detector 36. Optical detector 34 functions to provide an electrical output signal over lead 37 to an input of data output register 38. Optical detector 36 functions to provide an electrical signal over lead 39 to a second input of data output register 38. Memory control circuit 18 provides a control signal, such as a strobe or clock signal, over lead 40 to a control input of data output register 38 which may be, for example, a register for holding detected data and a input amplifier. Data output register 38 functions to provide a 1 or 0 depending on the input signals on leads 37 and 39 to provide a data output signal of a 1 or 0 on lead 41.

Analyzer 32 may pass polarized light from light beam 30 as light beam 33 polarized in a first direction to optical detector 34. Analyzer 32 may pass polarized light from light beam 30 as light beam 35 polarized in an orthogonal direction to optical detector 36.

Optical detectors 34 and 36 function to provide an electrical signal indicative of the intensity of the respective light beam 33 and 35 from analyzer 32 whereby optical rotation of light beam 30 with respect to light beam 24 is detected. The optical rotation corresponds to the Kerr or Faraday rotation of a light beam at a selected photon energy, temperature and magnetization direction of magnetic material 12.

Data is written into magnetic material 12 by a write signal over lead 46 to a control input of memory control circuit 18. The data to be written into the magnetic material 12 is provided over lead 47 to a data input of memory control circuit 18. The data on lead 47 may be a 1 or a 0. Memory control circuit 18 provides a control signal over lead 48 to radiant energy source 50. Radiant energy source 50 provides a beam 52 of radiant energy towards mirror 53 which redirects beam 52 through lens 25 to the upper surface 27 of magnetic material 12. It is understood that if beam 52 is present during write operation, then laser 20 would be off and there would be no beam 24 of radiant energy. Alternatively, laser 20 may be operated at higher power and perform the function of radiant energy source 50. Memory control circuit 18 provides a control signal over lead 56 to an input of positioner 57. Positioner 57 has a mechanical link 58 to magnetic material 12 and functions to position magnetic material 12 with respect to beams 24 or 52. As shown in FIG. 1, positioner 57 may function to move beams 24 and 52 with respect to the upper surface 27 of magnetic material 12. Alternately, magnetic material 12 may be moved underneath beams 24 and 52. For example, substrate 14 may be a disk which moves or rotates magnetic material 12 below beams 24 and 52. The disk may have a plurality of tracks each having a predetermined width and a predetermined spacing between tracks forming a circular path on the substrate 12. Alternately, the track may take a spiral path. Positioner 57 may control a motor 59 by way of lead 55 and mechanical link 58 may include a spindle 60 for rotating magnetic material 12.

Memory control circuit 18 provides a control signal over lead 61 to an input of magnetic field generator 62. Magnetic field generator 62 functions to provide a magnetic field B at first times in a first direction shown by arrow 64 and at second times in a second direction shown by arrow 65 in magnetic material 12. The first and second directions may be at an angle such as 90 to 270 or 0 to 180 degrees. Radiant energy source 50 may have a power in the range from 20 to 40 milliwatts and be pulsed under the control of memory circuit 18 by way of lead 48. Beam of radiant energy 52 functions to heat magnetic material 12 to lower the coercivity $H_c$ of magnetic material 12. Magnetic field generator 62 functions to provide a magnetic field H in magnetic material 12 which exceeds $H_c$ at the time magnetic material 12 is heated by beam of radiant energy 52. Beam 52 of radiant energy may heat a spot size having a diameter equal to the wavelength of the radiant energy source. Magnetic material 12 not heated by beam 52 has a coercivity $H_c$ greater than the magnetic field H generated by magnetic field generator 62. Magnetic field generator 62 may generate a magnetic field in a first or second direction in magnetic material 12 as a function of the data on lead 47.

As shown in FIG. 1 during read operation, beam 24 of radiant energy passes through layer 13 and substrate 14 to emerge as light beam 30. Alternatively, magnetic material 12 may be reflecting to allow beam 24 to be reflected whereupon analyzer 32 would be positioned to intercept reflected beam 30'.

Figure 2:
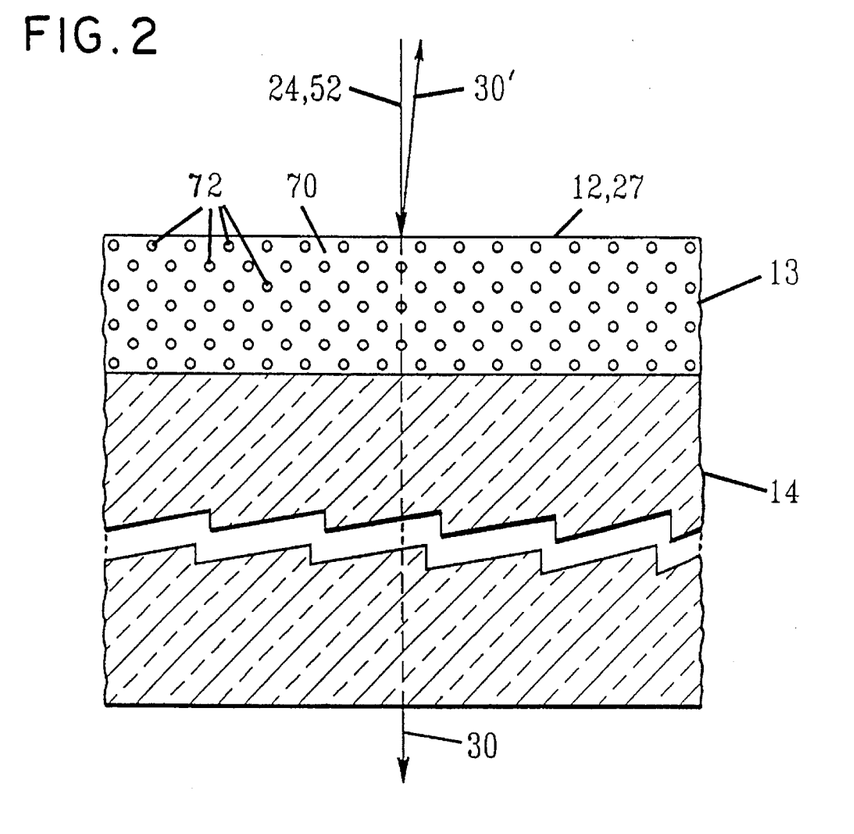
FIG. 2 is a cross-section view along the lines 2—2 of FIG. 1.

FIG. 2 shows an enlarged partial cross-section view along the lines 2—2 of FIG. 1. Layer 13 of magnetic material 12 may comprise a matrix 70 of metal selected from the group consisting of iron, cobalt, nickel and alloys thereof. Matrix 70 forming layer 13 may have an easy axis anisotropy perpendicular to the upper surface 27 of layer 13. Matrix 70 may have a plurality of separated phases 72 distributed in matrix 70. The composition of separated phases 72 may be selected from the group consisting of EuS, EuO, EuOTb, PtMnSb, MnAs, MnBi, MnSb, $CrO_2$, CrTe, GdN, and $Gd_4C$. The separated phases 72 in matrix 70 may be in the range from 5 to 40 mole percent. Layer 13 may have a thickness in the range from 1,000 to 5,000 Å. Separated phases 72 may have a longitudinal dimension of 100 Å. Inasmuch as the separated phases are formed by material precipitating out of matrix 70, the longitudinal dimensions of separated phases 72 may vary in the range from 10 Å to 300 Å and may have, for example, a Gaussian distribution with a peak of the distribution corresponding to separated phases 72 having a longitudinal dimension in the range from 100 to 150 Å. Separated phases 72 form crystallites in matrix 70. Matrix 70 may be, for example, cobalt which may be amorphous, crystalline or crystalline having a predetermined orientation. Separated phases 72 may be selected from the group consisting of a compound of a rare earth element and manganese compound. Separated phases 72 in matrix 70 function to provide antiferromagnetic coupling at the interface between separated phases 72 and matrix 70. The result of the antiferromagnetic coupling is that magnetic material 12 behaves as a macroscopic ferrimagnet. Further, while the compound forming the separated phases has a predetermined bulk Curie temperature, the antiferromagnetic coupling or negative exchange at the interface between the separated phases 72 and matrix 70 results in an increase in the Curie temperature of magnetic material 12.

Figure 3:
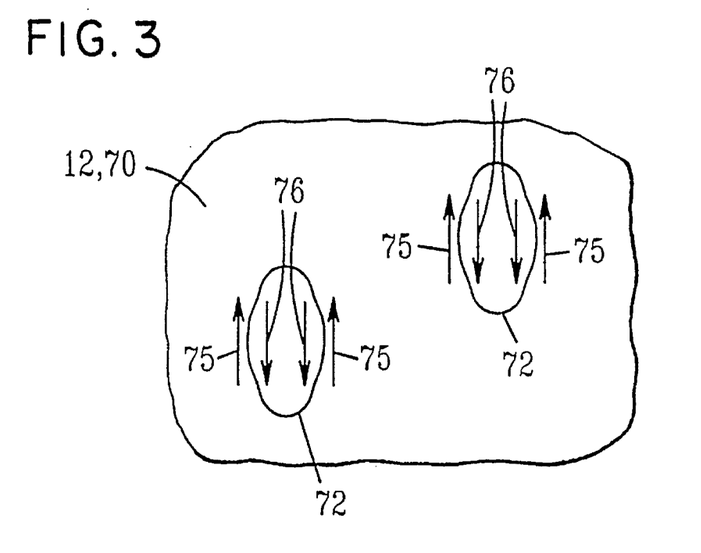
FIG. 3 is a schematic diagram of EuS particles in a cobalt matrix.

FIG. 3 shows a schematic diagram of europium sulfide (EuS) particles in a cobalt matrix. Cobalt normally has its easy access perpendicular to upper surface 27 of layer 13. The easy axis or magnetization axis of cobalt is shown in FIG. 3 by arrows 75. The magnetization axis of europium sulfide is in the opposite direction of the easy axis of cobalt as shown by arrows 76 in FIG. 3. The same opposite direction shown by arrows 76 would be provided if europium sulfide was replaced with a rare earth compound or a manganese compound such as MnAs, MnSb or MnBi. The intensity of magnetization shown by arrow 76 is dependent on the temperature of magnetic material 12. The net magnetization of magnetic material 12 is reduced at times when the magnetization of cobalt shown by arrow 75 is balanced with the magnetization of europium sulfide shown by arrow 76. The magnetization is determined by the temperature of magnetic material 12 and the mole percent of europium sulfide forming separated phases 72 in matrix 70.

Figure 4:
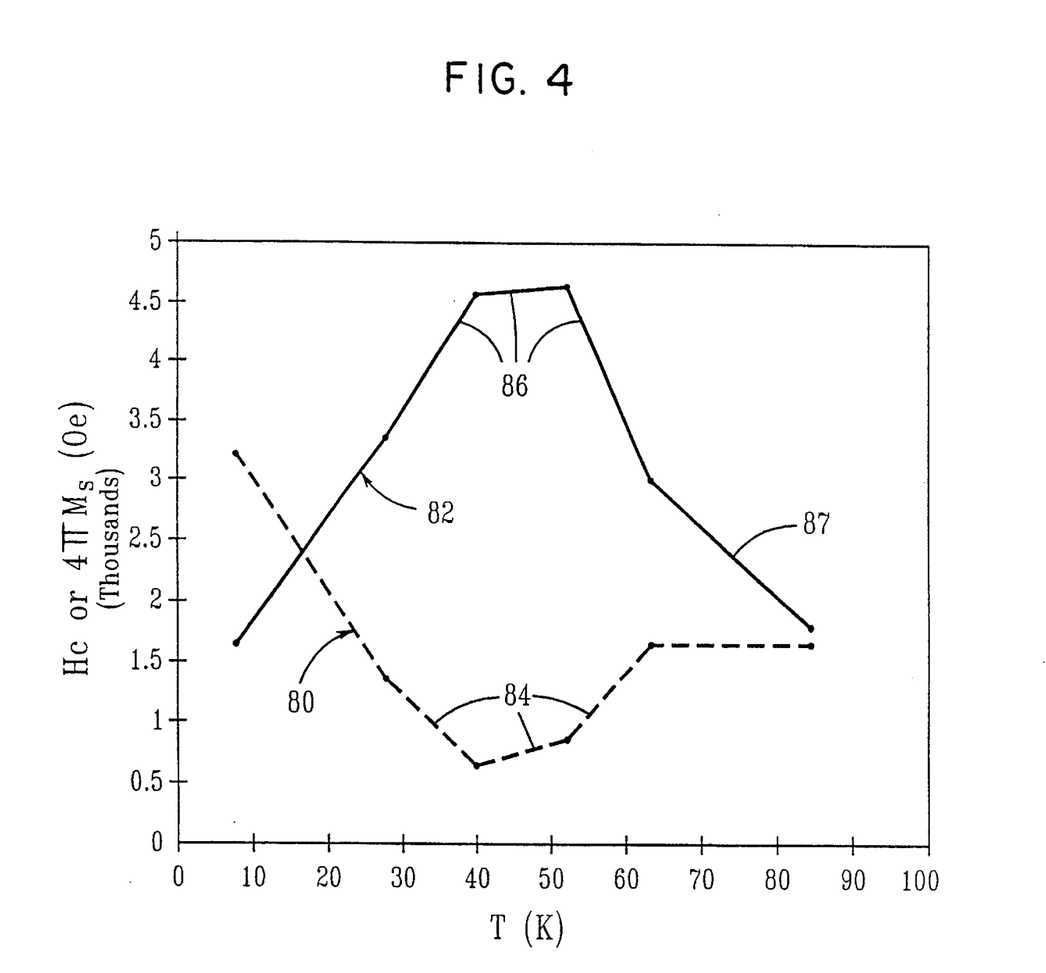
FIG. 4 is a graph of the magnetization and coercivity versus temperature for a cobalt matrix with 30% EuS particles.

Referring to FIG. 4, a graph is shown of the magnetization and coercivity versus temperature of layer 13 having a matrix 70 of cobalt having separated phases 72 of EuS comprising 30 mole percent in matrix 70. In FIG. 4, the ordinate represents magnetization 4IIMs with respect to curve 80 and coercivity $H_c$ with respect to curve 82. The abscissa represents temperature in Kelvin. The magnetic exchange interaction at the interface between the cobalt matrix 70 and the separated phases 72 of EuS is negative so the magnetization of the cobalt is opposite to the magnetization of the EuS. This antiferromagnetic coupling or ferrimagnetic coupling leads to compensation point-like behavior of magnetic material 12 with the magnetization going through a minimum as shown by curve portion 84 in FIG. 4. Curve portion 84 does not go through 0 as in normal, atomic scale ferrimagnets. The minimum magnetization as shown by curve portion 84 is in the temperature range from 37 to 52 Kelvin. As shown in FIG. 4 the coercivity $H_c$ shown by curve 82 goes through a maximum shown by curve portion 86 which is also in the temperature range from 37 to 52 Kelvin. The coercivity $H_c$ decreases at temperatures above 60K as shown by curve portion 87 and thus would not be operable for storing data at room temperature.

Figure 5:
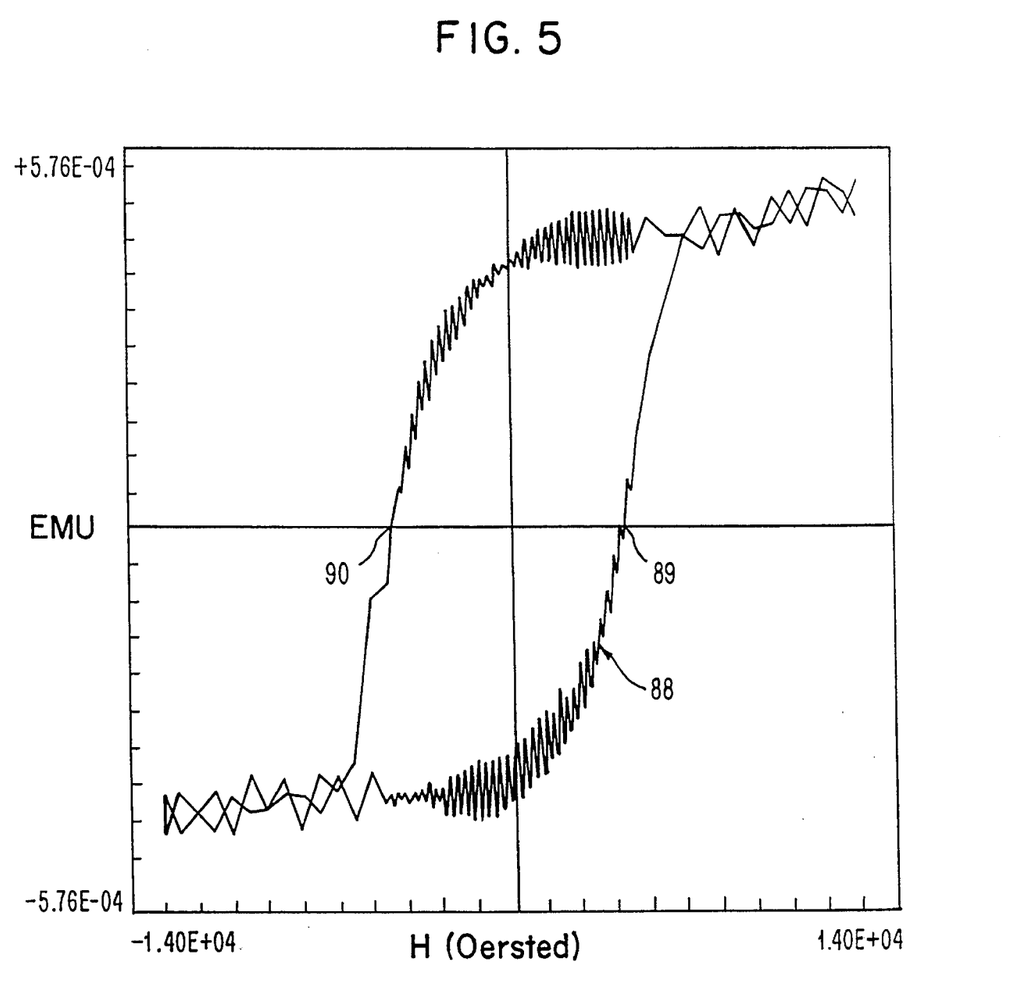
FIG. 5 is a graph of the magnetization loop of a cobalt matrix with 30 mole percent EuS particles at 52K.

FIG. 5 is a graph of the magnetization loop for the magnetic material 12 used to generate FIG. 4, i.e. 30 mole percent EuS of separated phases 72 in a cobalt matrix 70 at a temperature of 52 Kelvin. In FIG. 5, the ordinate represents magnetization in EMU from a volume of $7.26 \times 10^{-6}$ cc of magnetic material 12 and the abscissa represents the applied magnetic field H in Oersted. In FIG. 5, the magnetization loop is shown by curve 88. The coercivity $H_c$ is shown by points 89 and 90 on curve 88 is 4.6 kOe and the magnetization loop has a squareness of 0.86.

Magnetic material 12 comprising a matrix 70 of cobalt and separated phases 72 of EuS at 10 and 20 mole percent have similar behavior as 30 mole percent EuS shown in FIGS. 4 and 5. The low magnetization of 10 and 20 mole percent EuS in cobalt is similar to curve portion 84 with more square loop behavior similar to curve 88 in FIG. 5 at lower temperatures than the 52 Kelvin temperature of FIG. 5. The magnetization of EuS increases with decreasing temperature which cancels out the Co magnetization more effectively. The compensation point in the magnetic material 12 having matrix 70 of cobalt and separated phases 72 of EuS forming 20 mole percent of matrix 70 is about 20 Kelvin.

The negative exchange coupling between matrix 70 of Co and separated phases 72 of EuS raises the Curie temperature of EuS in matrix 70. The cancellation of the magnetization components in magnetic material 12 extends well above the Curie temperature of bulk EuS which is 16K.

Figure 6:
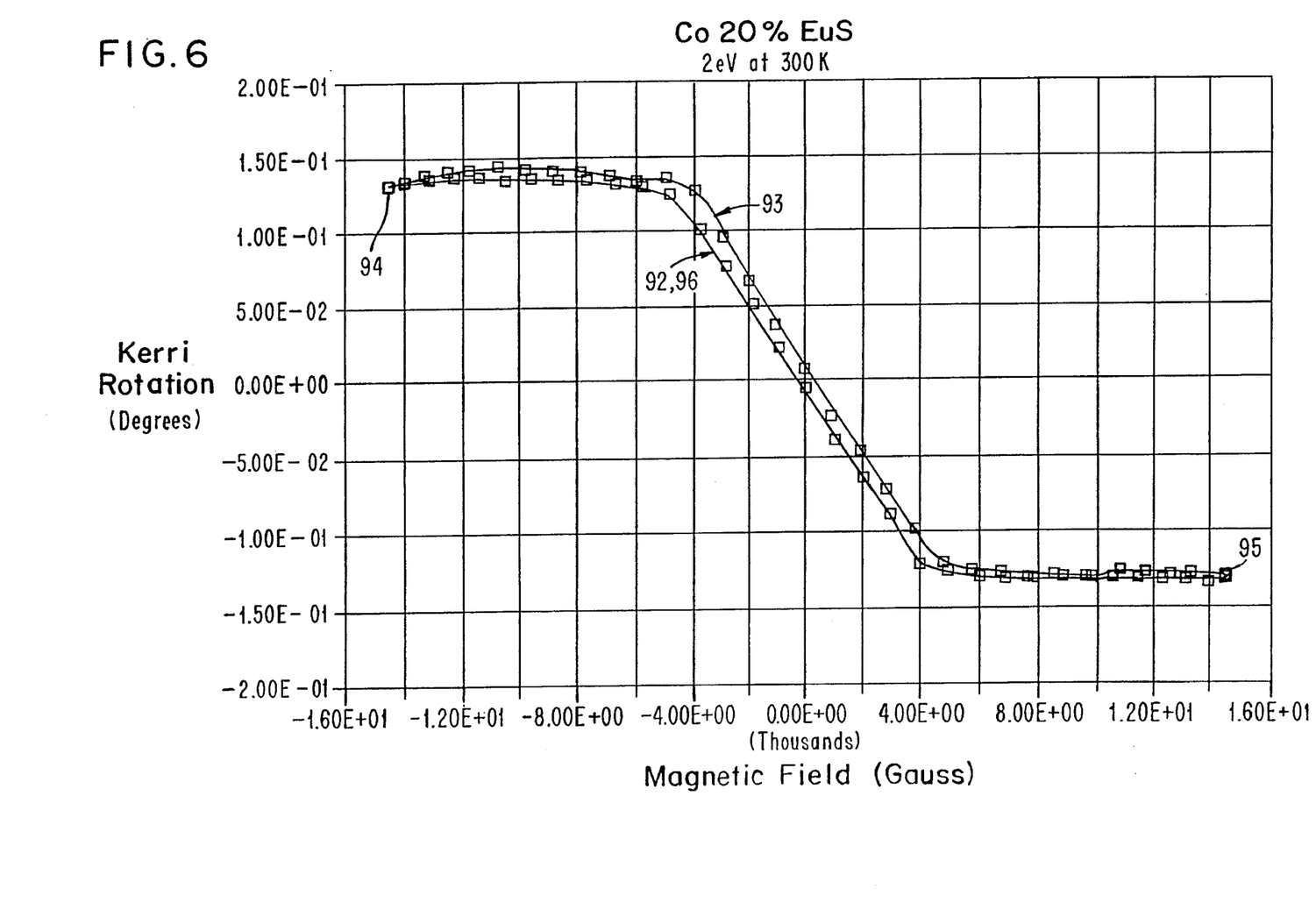
FIG. 6 is a graph of the Kerr hysteresis loop for a cobalt matrix with 20% EuS particles at 300K.

There is evidence that the magneto-optic rotation in magnetic material 12 comprising a matrix 70 of Co and separated phases 72 of EuS has some rotation at room temperature (300K). FIG. 6 is a graph of the Kerr hysteresis loop 96 for a matrix 70 of cobalt with separated phases 72 of EuS forming 20 mole percent of magnetic material 12 at 300K. It is noted that the magnetic material 12 tested in FIG. 6 did not exhibit a square loop characteristic of the magnetization versus coercivity. However, the fact that magnetic material 12 exhibited perpendicular anisotropy at 300K with respect to the upper surface of layer 13 was significant.

In FIG. 6, the ordinate represents the Kerr rotation in degrees and the abscissa represents the magnetic field in Oersted in magnetic material 12. The hysteresis loop is shown by curves 92 and 93 in FIG. 6. Curves 92 and 93 join together at end points 94 and 95 to form a loop 96. The Kerr rotation, as shown in FIG. 6 with a light beam of photon energy at 2 eV, is 0.13°. With matrix 70 of cobalt and separated phases 72 of EuS forming 10 mole percent of magnetic material 12, a Kerr rotation of 0.20° is obtained indicating that the fall-off in Kerr rotation is much faster than dilution of EuS which would be expected if separated phases 72 of EuS were magnetically dead at room temperature (300K). The value of the Kerr rotation of pure Co as found from available publications is 0.30° at a photon energy of 2 eV. Separated phases 72 of EuS in matrix 70 of cobalt where EuS forms 10 mole percent of magnetic material 12 should have a rotation of 0.27°. For 20 mole percent of EuS in a matrix 70 of cobalt, a rotation of 0.24 would be obtained in a simple dilution model. Separated phases 72 of EuS is expected to change sign at lower photon energies of an impinging optical beam which should enhance the rotation at longer wavelengths such as 800 nm. It is understood that if an optical beam passes through a material, the rotation and polarization is called the Faraday effect. If the optical beam is reflected from the surface of the magnetic material, the resulting rotation and polarization is called the Kerr effect or Kerr rotation. If data is stored in magnetic material 12 by the easy axis of the magnetization being perpendicular to the plane of layer 13 of magnetic material 12 and pointing up toward the upper surface or down away from the upper surface, the Kerr rotation will experience a change of Kerr rotation of 0.26°.

Figure 7:
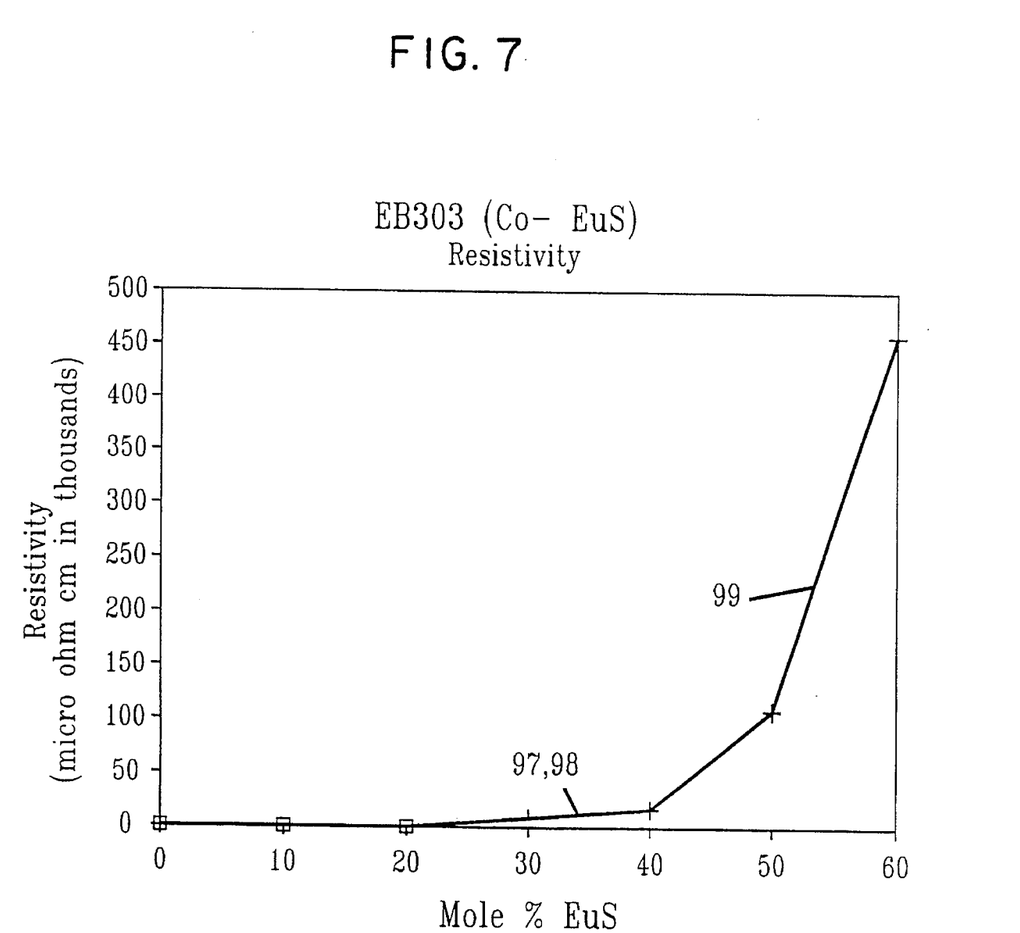
FIG. 7 is a graph of the resistivity versus mole percent EuS in a series of Co-EuS films.

FIG. 7 is a graph of the resistivity of magnetic material 12 versus mole percent of EuS in magnetic material 12. In FIG. 7, the ordinate represents resistivity in micro ohm centimeter and the abscissa represents mole percent EuS in a matrix of cobalt. In FIG. 7, the composition dependence of the resistivity gives evidence of phase separation into a metallic phase (mainly Co) and a semiconductor phase (mainly EuS). Curve 97 shows the change of resistivity of magnetic material 12 with increasing mole percent of EuS. Curve 98 shows the resistivity gradually increasing in the range from 20 to 40 mole percent EuS. Curve portion 99 shows the resistivity rapidly increasing from 50 to 60 mole percent EuS. Curve 97 is characteristic of a percolation threshold where patches of the metallic phase or matrix 70 becomes disconnected from each other by the insulating phase or separated phases 72, usually at about 75 volume percent of the insulating phase. In contrast to curve 97, amorphous rare earth-cobalt alloys have a weak linear dependence of resistivity on the rare earth atomic fraction.

Films of magnetic material 12 were prepared by two source e-beam evaporation onto substrates cooled in the range from 20 C. and below. A room temperature substrate may be used, however, heat from the two source e-beam evaporation can drive the substrate temperature above room temperature. It is a better practice to intentionally cool the substrate to a known temperature such as −15° C. In these initial experiments, nothing was done to try to enhance the preferred (111) texture of the Co film. This could be done by growing a thick Pt layer first which develops a strong (111) texture even at substrate temperatures of less than 100 C. The Co will then be grown epitaxially on the textured Pt. The epitaxial growth can be carried out at room temperature or at slightly elevated substrate temperatures.

The formation of magnetic material 12 that acts as a macroscopic ferrimagnet requires combinations of materials with the following properties: the materials codeposited must phase separate, the materials deposited must have negative (antiferromagnetic) exchange interaction at their interface, and both phases must be magnetically ordered at room temperature. Magnetic materials that can be expected to phase separate in cobalt are: EuS, EuO,PtMnSb, MnAs, MnBi, MnSb, $CrO_2$, CrTe, GdN and $Gd_4C$.

The negative exchange coupling between separated phases 72 and matrix 70 is expected for all compounds of heavy rare earths including Tb, Dy, Ho, Er, Tm, Yb and Lu and of the early 3d transition metals such as Mn and Cr. The Curie temperatures of EuO and GdN are close to 70K in bulk samples. Separated phases 72 of EuO or GdN having negative exchange coupling to matrix 70 of cobalt should have a larger contribution at room temperature than EuS which has a Curie temperature of 16K. Compounds of PtMnSb, MnAs, CrTe, $CrO_2$ and $Gd_4C$ all have Curie temperatures at or above room temperature (300K) even in bulk form, without interface exchange enhancement.

A magnetic material 12 which may be formed by codepositing two different materials which phase separate is easier to produce than multilayers of two materials having carefully controlled thicknesses. Magnetic material 12 is more transparent than multilayers of CoPt which is important for volumetric storage (reading and writing one layer through another). Magnetic material 12 where matrix 70 is cobalt and the separated phases is EuS or made with Mn compounds have higher optical rotations at longer wavelengths such as 800 nm. However, the wavelength of EuS can be "tuned" to shorter wavelengths by doping magnetic material 12 with trivalent rare earth metals such as Tb. The magnetic material made with doped EuS or EuO may be suitable for operation at 400 nm. In place of matrix 70 of Co, matrix 70 may be an amorphous TbCo alloy and the separated phases 72 may include, for example, EuO-Tb.

Magnetic material 12 shown in FIG. 2 may be modified by adding a source of a rare earth element such as Tb or Nd. The rare earth may be co-evaporated with an additional electron beam at the time matrix 70 of metal and the material for the separated phases 72 is evaporated. The rare earth forms an alloy with the metal selected for matrix 70 such as cobalt and a portion precipitates out with separated phases 72 to form a solid solution with the material selected for separated phases 72 such as EuS. The presence of the rare earth in matrix 70 and separated phases 72 functions to enhance the optical rotation at certain wavelengths such as 400 nm. A magnetic material 12 of EuOTb (FeCo) has been made, measured, and shown to have magneto-optic rotation at 300K.

Figure 8:
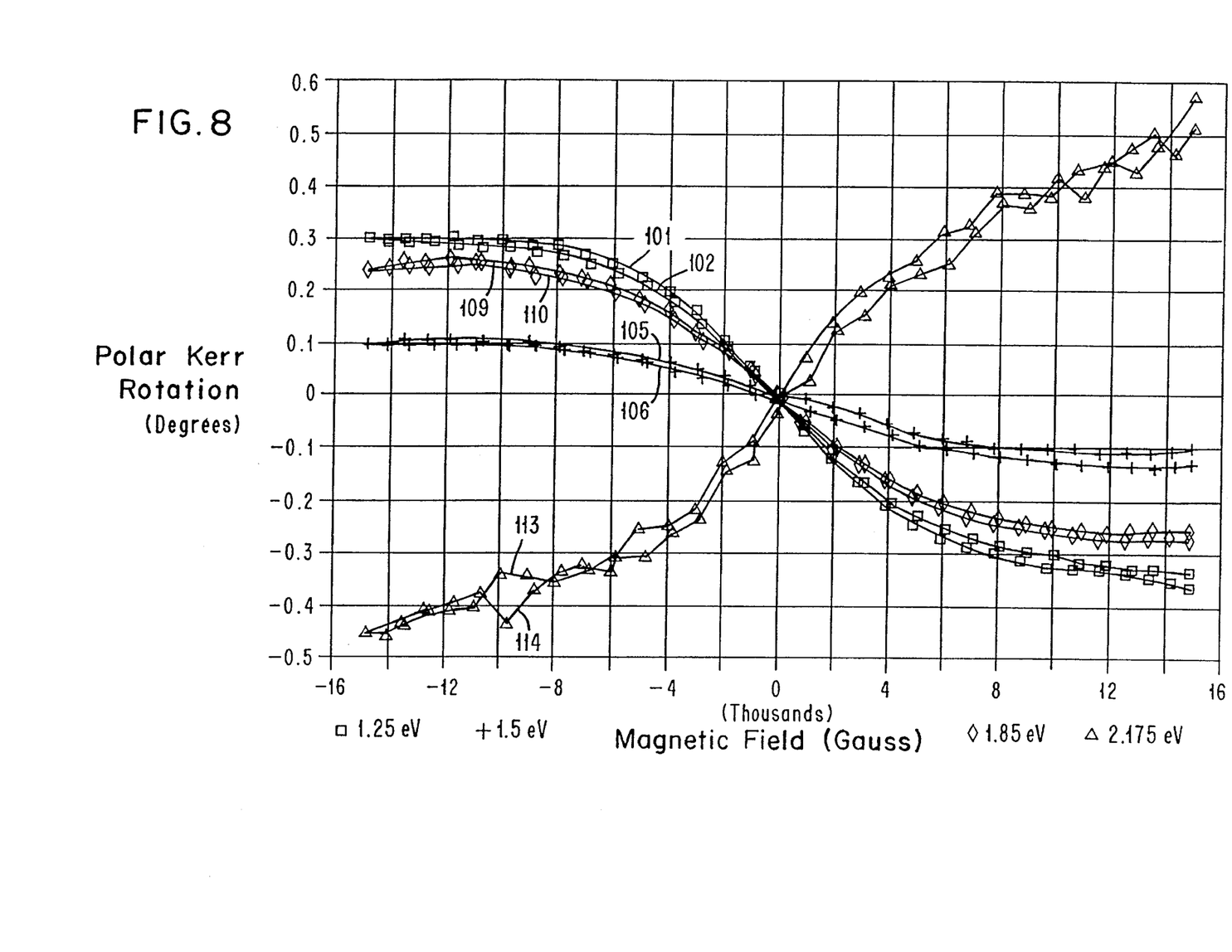
FIG. 8 is a graph of the Polar Kerr Rotation versus magnetic field in EuOTb (FeCo) at 300K. measured with light at a number of photon energies.

FIG. 8 is a graph of the Polar Kerr Rotation versus magnetic field at various photon energies of an incident light beam 24 passing through magnetic material 12 of EuOTb (FeCo). In FIG. 8, the ordinate represents Polar Kerr Rotation in degrees and the abscissa represents magnetic field in Gauss. Curve 101 and 102 show the test results for an optical beam with photon energy of 1.25 eV. Curve 105 and 106 are the test results for a light beam having a photon energy of 1.5 eV. Curves 109 and 110 are the test results for a light beam having a photon energy of 1.85 eV. Curve 113 and 114 are the test results for a light beam having a photon energy of 2.175 eV. Curves 101, 102, 105, 106, 109 and 110 show negative rotation for an optical beam with photon energies at 1.85 eV and below to 1.25 eV. Curves 113 and 114 show positive rotation of an optical beam having a photon energy at 2.175 eV at 300K. The positive rotation above 2 eV is surprising because the Curie temperature for EuO is about 70K in bulk samples. The large positive rotation of 0.6 of a degree at 2.175 eV as shown by curves 113 and 114 in FIG. 8 suggest that EuO is magnetically active in the magnetic material 12 or composite at 300K. Available data from a publication by G. S. Krinchik et al., Sov. Phys. JETP 26, 1080(1968) shows that Fe, Co and Ni have negative Kerr rotation in the range from −0.55 to −0.02 where the optical beam has photon energy in the range from 1 to 4 eV. Since these elements have negative values at 2.175 eV, they cannot produce the positive rotation seen in curves 113 and 114 in FIG. 8. The mechanism for the positive rotation, shown by curves 113 and 114 in FIG. 8, is probably due to the negative exchange coupling between EuO and the metals FeCoTb in matrix 70 which, in turn, increases the Curie temperature of the magnetic material of EuOTb (FeCo) and give it the required properties for optical storage amplifications.

Figure 9:
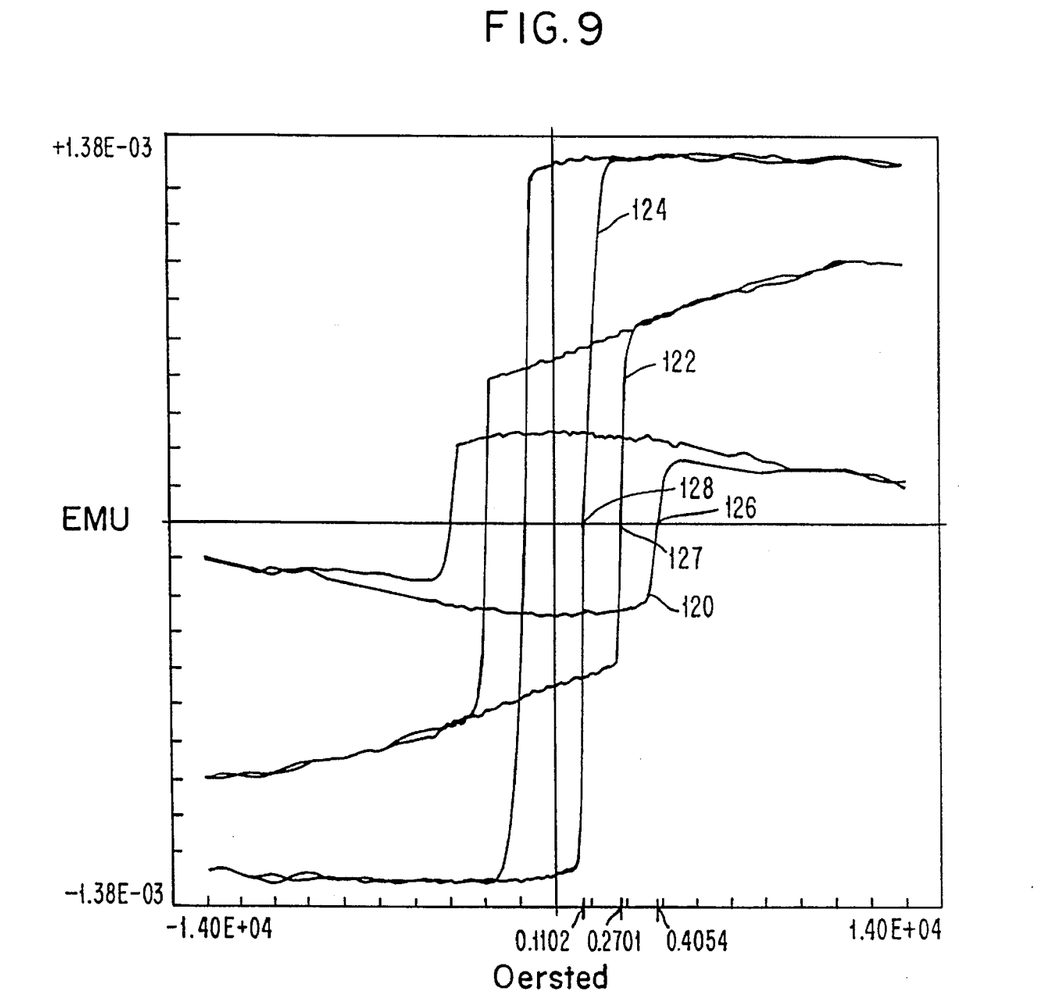
FIG. 9 is a graph of the magnetization versus applied magnetic field H for various compositions of CoEuSTb at 300K.

FIG. 9 is a graph of the magnetization versus applied magnetic field H for various sample compositions of CoEuSTb at 300K.

Figure 10:
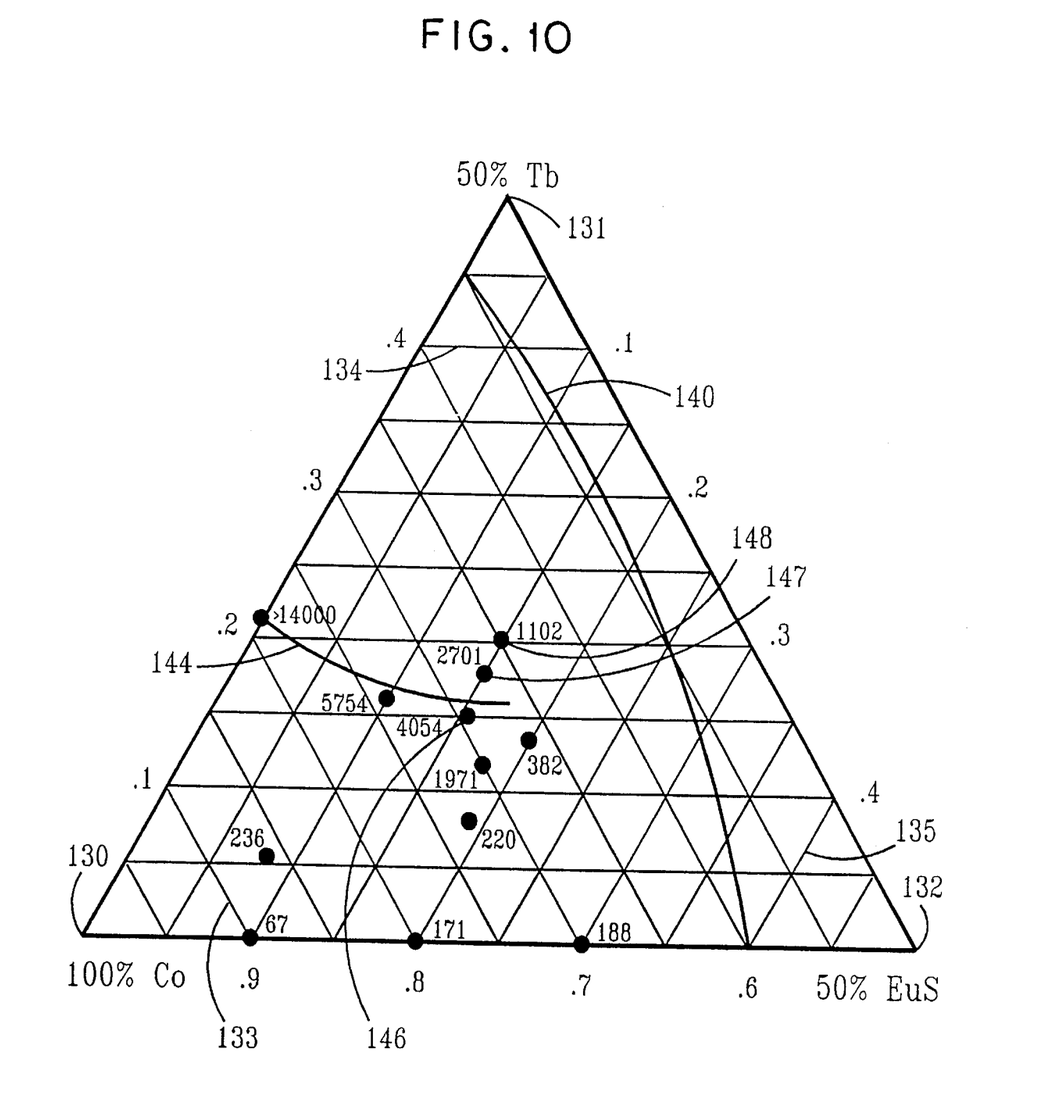
FIG. 10 is a ternary phase diagram of CoEuSTb.

In FIGS. 9 and 10, the compositions were a two phase material with a rocksalt structure of EuSTb being in one phase and amorphous CoTb being in the other phase. The above two phase material was verified with X-ray diffraction.

In FIG. 9, the ordinate represents magnetization and the abscissa represents applied magnetic field H perpendicular to the plane of the layer or film. The volume of each sample compositions was about the same with a volume of $1.25 \times 10^{-5}$ cc. The measurements of the respective layer or film were made with a Vibrating Sample Magnetometer (VSM). Curve 120 was obtained from a layer having a composition of 69 mole percent Co, 16 mole percent EuS and 15 mole percent Tb.

Curve 122 was obtained from a layer having a composition of 67.5 mole percent Co, 15 mole percent Eus and 17.5 mole percent Tb. Curve 124 was obtained from a layer having a composition of 65 mole percent Co, 15 mole percent EuS and 20 mole percent Tb. Curves 120, 122 and 124 show high coercivity $H_c$ at room temperature (300K) and good square loop characteristics. Point 126 on curve 120 has a coercivity of 4054 Oersteds. Point 127 on curve 122 has a coercivity of 2701 Oersteds. Point 128 on curve 124 has a coercivity of 1102 Oersteds.

FIG. 10 is a ternary phase diagram of CoEuSTb showing various compositions and their respective coercivity at room temperature (300K). In FIG. 10, point 130 represents 100 mole percent Co, point 131 represents 50 mole percent Tb and point 132 represents 50 mole percent EuS. Any point along line 133 represents constant 90 mole percent Co. Any point along line 134 represents constant 40 mole percent Tb. And any point along line 135 represents 40 mole percent EuS.

In FIG. 10, curve 140 represents an estimate based on laboratory data of compositions with a Curie point at room temperature. All compositions to the left of curve 140 are magnetic at room temperature and above and are therefore useable at room temperature. Curve 144 represents an estimate based on laboratory data of compositions with a magnetic compensation point at room temperature (300K). Compositions near curve 144 have a high coercive magnetic field $H_c$ at room temperature which is desirable. Each solid circle represents a composition that was measured and each number adjacent a respective solid circle represents the measured coercivity $H_c$ in Oersteds perpendicular to the plane of the layer or film. The highest coercivities $H_c$ are for compositions near curve 144. Solid circles 146, 147 and 148 have respective coercivities of 4054, 2701 and 1102 and correspond to the compositions and coercivities at points 126–128 respectively in FIG. 9.

A magnetic material such as composite magneto-optic media and a magneto-optic memory for using the magnetic material has been described wherein the magnetic material or composite includes a matrix of metal selected from the group consisting of iron, cobalt, nickel and alloys thereof, and a plurality of separated phases distributed in the matrix, the separated phases selected from the group consisting of EuS, EuO, EuOTb, PtMnSb, MnAs, MnBi, MnSb, $CrO_2$, CrTe, GdN, and $Gd_4C$.

The invention further describes a magnetic material or composite comprising a matrix of metal selected from the group consisting of iron, cobalt, nickel and alloys thereof, and a plurality of separated phases distributed in the matrix, the separated phases include a manganese compound or a compound of an element selected from the group consisting of a rare earth (atomic number 57–71).

The invention further describes a magnetic material including a matrix of metal selected from the group consisting of iron, cobalt, nickel, terbium neodymium and alloys thereof and a plurality of separated phases selected from the group consisting of EuS, EuO, EuOTb, PtMnSb, MnAs, MnBi, MnSb, $CrO_2$, CrTe, GdN and $Gd_4C$ in solution with terbium or neodymium.

While there has been described and illustrated a magneto-optic memory and a magnetic material, it will be apparent to those skilled in the art that modifications and variations are possible without deviating from the broad scope of the invention which shall be limited solely by the scope of the claims appended hereto.

Having thus described our invention, what we claim as new and desire to secure by Letters Patents is:

1. A magnetic material comprising:

a matrix of metal selected from the group consisting of iron, cobalt, nickel and alloys thereof, and a plurality of separated phases distributed in said matrix, said separated phases selected from the group consisting of EuS, EuO, EuOTb, PtMnSb, MnAs, MnBi, MnSb, $CrO_2$, CrTe, GdN, $Gd_4C$, and compounds of Dy, Ho, Er, Tm, Yb and Lu, said separated phases distributed in said matrix in the range from 5 to 40 mole percent with respect to said matrix of metal.

2. The magnetic material of claim 1 further including a rare earth element alloyed with said matrix of metal and including said rare earth element in solid solution in said plurality of separated phases.

3. The magnetic material of claim 2 wherein said rare earth element includes Tb.

4. The magnetic material of claim 1 wherein said material is a thin film having a thickness in the range from 1,000 to 5,000 Å.

5. The magnetic material of claim 1 wherein said material exhibits substantially perpendicular anisotropy with respect to a major surface of a layer of said material.

6. The magnetic material of claim 1 wherein said material exhibits magneto-optic rotation at 300 Kelvin.

7. The magnetic material of claim 1 wherein said separated phases include a semiconductor phase.

8. The magnetic material of claim 1 wherein said separated phases includes a solid solution of Tb.

9. The magnetic material of claim 1 wherein said matrix of metal further includes a rare earth.

10. The magnetic material of claim 1 wherein said matrix of metal further includes Tb.

11. The magnetic material of claim 1 wherein said matrix of metal includes FeCoTb and said plurality of separated phases including EuOTb.

12. A magnetic material comprising:

a matrix of a metal selected from the group consisting of iron, cobalt, nickel and alloys thereof, and particles of EuS distributed in said matrix, said particles of EuS distributed in said matrix in the range from 5 to 40 mole percent with respect to said matrix of metal.

13. The magnetic material of claim 12 wherein said material is a thin film having a thickness in the range from 1,000 to 5,000 Å.

14. The magnetic material of claim 12 further including a rare earth element alloyed with said matrix of metal and including said rare earth element in solid solution in said particles of EuS.

15. The magnetic material of claim 14 wherein said rare earth element includes Tb.

* * * * *